Figure 1:
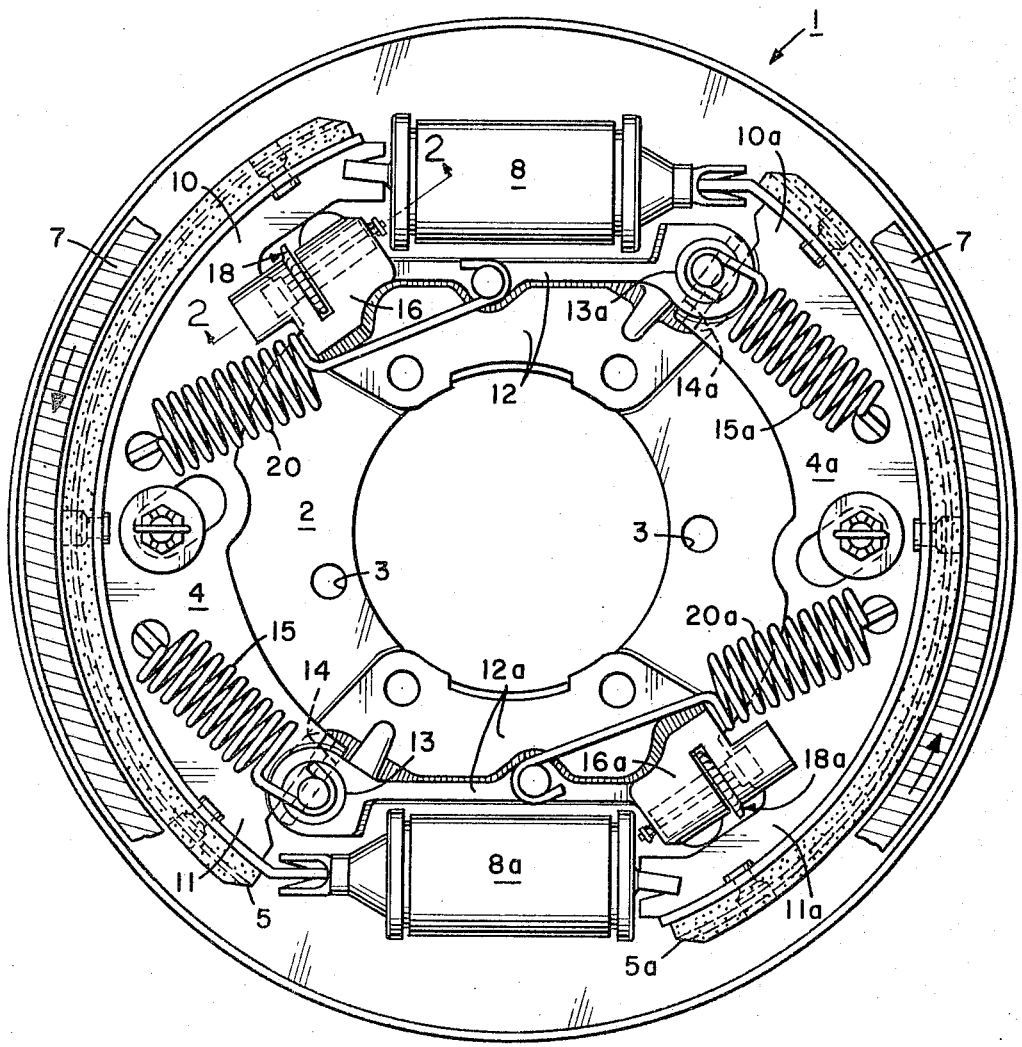

INVENTOR
PATRICK S. STELLA
BY
William R. O'Meara

United States Patent Office 3,299,992
Patented Jan. 24, 1967

3,299,992
AUTOMATIC ADJUSTING MECHANISM
Patrick S. Stella, Olivette, Mo., assignor to Wagner Electric Corporation, St. Louis, Mo., a corporation of Delaware
Filed Dec. 24, 1964, Ser. No. 420,884
9 Claims. (Cl. 188—79.5)

This invention relates to automatic adjusting mechanisms and, more particularly, to an automatic adjusting mechanism for controlling the displacement of a friction member of a friction device.

It is a general object of the present invention to provide novel automatic adjusting means for maintaining the displacement between a movable friction member and another friction member cooperable therewith substantially constant irrespective of friction member wear occasioned by frictional engagement between the friction members.

Another object of the present invention is to provide a novel adjustment mechanism for automatically adjusting the retracted position of a friction member of a friction device in substantially a stepless manner to maintain the clearance between the friction member and a cooperable friction element of the device substantially constant irrespective of friction member wear.

Still another object is to provide a novel automatic adjustment mechanism for automatically adjusting the retracted position of a friction member of a friction device to maintain the clearance between the friction member and a cooperable friction element of the device substantially constant and wherein the adjustment mechanism requires a minimum number of separate parts.

These and other objects and advantages of the present invention will be apparent hereinafter.

Briefly, the present invention embodies adjustment means for a movable friction member of a friction device which includes means adjustably movable on a friction device and defining the retracted position for the friction member, a friction connection for a frictional driving engagement with said first named means to effect the adjusting movement thereof, follower means engaged with the friction member for movement in concert therewith, the follower means and friction means including means for urging said frictional connection into driving engagement with the first named means and thereafter translate the follower means movement into adjusting movement of said first named means to redefine the retracted position for the friction member.

Figure 2:
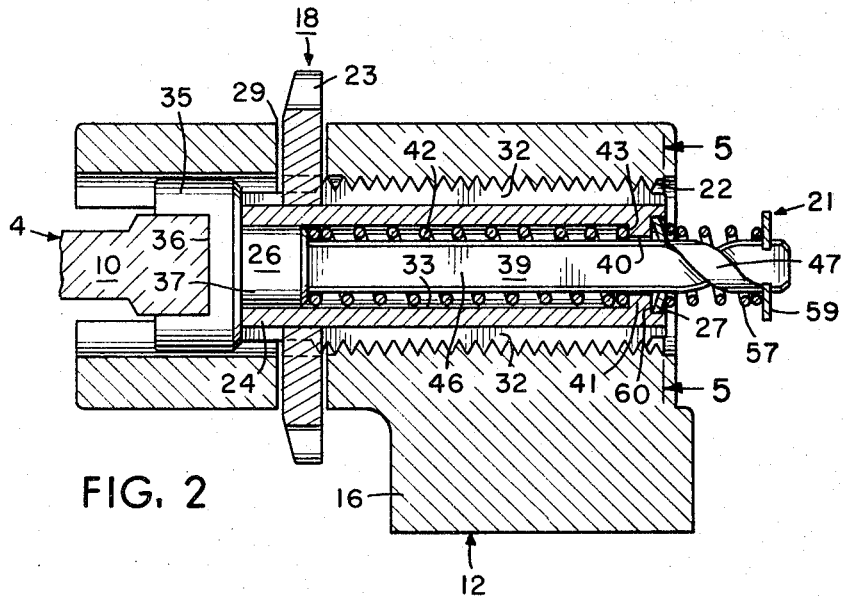
Figure 3:
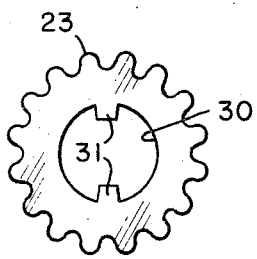
Figures 4, 4A:
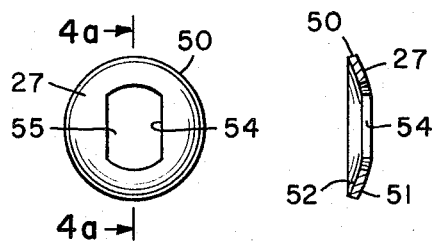
Figures 6, 6A:
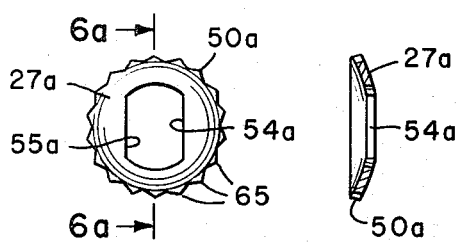
Figure 5:
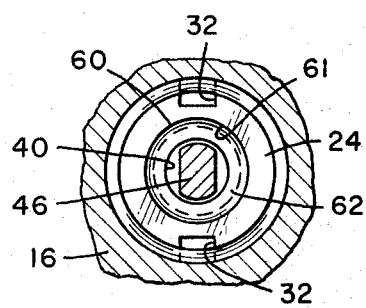

In the drawings which illustrate embodiments of the present invention,

FIG. 1 is an elevational view of a friction device embodying the present invention, FIG. 2 is a greatly enlarged sectional view taken along the line 2—2 of FIG. 1 showing the automatic adjusting means of FIG. 1, FIG. 3 is a plan view of the manual adjusting member of FIG. 2 on a reduced scale, FIG. 4 is a plan view of the drive means of the mechanism of FIG. 2 on an enlarged scale, FIG. 4a is a cross-sectional view taken along line 4a—4a of FIG. 4, FIG. 5 is a cross-sectional view taken along line 5—5 of FIG. 2 with the drive means removed for clarity, FIG. 6 is a plan view of a modified form of drive means on an enlarged scale, and FIG. 6a is a cross-sectional view taken along line 6a—6a of FIG. 6.

Referring now to FIG. 1 in particular, a friction device or wheel brake assembly 1 is shown provided with supporting means or a backing plate 2 having a plurality of centrally located mounting apertures 3 therein for connection with a vehicle axle flange (not shown). A pair of opposed radially displaceable members or brake shoes 4, 4a are slidably disposed on backing plate 2 having friction material or linings 5, 5a secured thereto, such as by rivets as shown or by the well-known method of bonding, the linings being adapted for frictional engagement with a relatively displaceable friction producing member or brake drum 7.

Actuator motors or wheel cylinders 8, 8a are diametrically and oppositely secured, such as by studs, on the backing plate 2 and are operatively connected with adjacent ends 10, 10a and 11, 11a of the brake shoes 4, 4a. Diametrically and oppositely disposed stationary supports or anchor brackets 12, 12a are also secured to the backing plate 2 between adjacent brake shoe ends 10, 10a and 11, 11a, with the anchor brackets also adapted for fixed connection, along with the backing plate, to the non-rotatable vehicle axle flange (not shown). Rotatable anchor pins 13, 13a having radially extending anchoring surfaces 14, 14a are pivotally mounted in the anchor brackets 12, 12a, and return springs 15, 15a are connected between the brake shoes 4, 4a and anchor pins 13, 13a to normally urge the brake shoe ends 11, 10a into respective sliding and pivotal anchoring engagement with the anchoring surfaces 14, 14a. Anchor brackets 12, 12a are also provided with integral portions or housings 16, 16a, and adjustable anchor means or adjustment mechanisms, indicated generally at 18, 18a, are operatively positioned in the anchor bracket housings 16, 16a. A pair of return springs 20, 20a are connected between the brake shoes 4, 4a and the anchor brackets 12, 12a, respectively, to normally urge the brake shoe ends 10, 11a into respective engagement with the adjustable anchor mechanisms 18, 18a. When the drum 7 is rotating in the forward direction, as indicated by the directional arrow, the brake shoe ends 10 and 11a are the unanchored or displaceable ends. However, when the drum 7 is rotating in the reverse direction opposite to the directional arrow, the anchoring and displaceable ends of the brake shoes 4, 4a are also reversed, that is, the brake shoe ends 10 and 11a become the anchor ends and brake shoe ends 10a and 11 become the displaceable ends.

The automatic adjustment mechanisms 18, 18a, with which the present invention is primarily concerned, are identical in construction and operation except that mechanism 18 automatically adjusts the retracted position of shoe 4 to compensate for wear of lining 5 while mechanism 18a automatically adjusts the retracted position of shoe 4a to compensate for wear of lining 5a. For this reason, only mechanism 18 is shown and described herein in detail.

As seen in FIG. 2, the adjustment mechanism 18 includes a pre-assembled automatic adjustor unit 21 disposed in a threaded bore 22 in the housing 16 of bracket 12 for automatically adjusting the retracted position of brake shoe 4, and a driving or starwheel member 23 for manually adjusting the retracted position of shoe 4. The adjustor unit 21 includes an adjustable anchor member or extendable, externally threaded adjusting screw or housing 24 threadedly received in bore 22, a resiliently urged follower member or push rod 26 adapted for concert movement with end 10 of shoe 4, and a resiliently urged annular drive member 27 on push rod 26 adapted for driving engagement with the adjusting screw 24 for rotating the adjusting screw 24 in response to a predetermined axial movement of push rod 26 to adjust the retracted position of shoe 4, as will be fully discussed hereinafter. The starwheel member 23 is disposed in a slot 29 which intersects bore 22 in bracket housing 16, and is provided with an opening 30, FIG. 3, through which the adjusting unit 21 extends. The opening 30 is of sufficient size to permit free axial movement of adjustor unit 21 relative to the starwheel member 23 and bracket 12.

The starwheel member 23 is also provided with a pair of opposed radially inwardly extending keys 31 which extend into a pair of opposed axially extending keyways 32 in screw 24 and serve to rotate the screw 24 when starwheel member 23 is manually rotated to provide means for manually adjusting the retracted position of shoe 4.

The adjusting screw 24 is provided with an axial or longitudinally extending bore 33 in which push rod 26 is slidably disposed for axial movement. The push rod 26 includes a head portion 35 external of the screw 24 adjacent the left end thereof having a diametrically extending cross-slot 36 which receives the shoe end 10 whereby the rod is held against rotation by the brake shoe 4. Integrally connected to and of smaller diameter than head 35 is an annular guide portion 37 slidably engaging bore 33 to guide the push rod for axial movement. Connected to the head 35 and guide portion 37 is a drive rod or stem 39 which is shown extending axially in bore 33 and through an opening 40 in the right end wall 41 of screw 24. A spring 42 is disposed in bore 33 concentrically with stem 39 between the guide portion 37 and a shoulder or axially inner side wall 43 of the end wall 41 to normally urge the push rod 26 into engagement with the shoe 4 for concert movement therewith. The stem 39 is provided with a straight portion 46 which is non-circular in cross-section, it being shown rectangular in cross-section in FIG. 5, and a curved or spiral driving portion 47 adjacent the right end thereof. The stem 39 may be formed, for example, from a straight metal bar of continuous rectangular cross-section by suitably twisting the end portion of the bar to provide the spiral end portion 47.

The drive member 27, which is shown also in FIGS. 4 and 4a, is a bowed or dished washer-like member of resilient or flexible metal, such as spring steel, having an annular radially outer peripheral surface 50 defined by outer peripheral edges 51 and 52, and a radially inner peripheral surface 54 defining a non-circular opening 55 shown as a generally rectangular opening which is complementary in shape to the rectangular stem 39 which extends through the opening 55. In the illustrated embodiment, the drive member 27 is disposed on push rod 26 externally of bore 33 and normally resiliently urged toward driving engagement with the adjusting screw 24 by a spring 57 disposed concentrically on the free end of stem 39 between the convex side of the drive member 27 and a spring retaining flange or snap ring 59 connected to the stem 39.

The adjusting screw 24 is provided with an annular recess or bore 60 formed in the exterior side of end wall 41. The recess has an axially extending cylindrical wall 61 and a radially extending bottom wall 62 intersecting wall 61. The diameter of the recess 60 is slightly larger than the outer diameter of drive member 27 so that, with the concave side of the drive member facing the screw 24, the outer peripheral surface 50 of the drive member 27 fits within the recess 60, as shown in FIG. 2.

In FIG. 2, the head portion 35 of push rod 26 is shown urged against the left end of adjusting screw 24 by the force of the shoe return spring 20 acting on shoe 4 to define the retracted positions of shoe 4 and push rod 26. In the retracted position of rod 26, the drive member 27 is disposed on the straight rectangular portion 46 of stem 39 with the start of the spiral portion 47 slightly spaced to the right thereof, the straight rectangular portion 46 cooperating with the rectangular inner peripheral surface 54 to prevent rotation of drive member 27. Upon movement of the push rod 26 a predetermined distance to the left, as viewed in FIG. 2, the spiral portion 47 enters the opening 55 in the drive member 27 with the spiral walls of the spiral portion 47 engaging the inner peripheral surface 54 to cause the drive member to follow the spiral portion and therefore rotate. This axial movement of the spiral portion 47 also applies an axial force on the drive member 27 urging it into frictional engagement with adjusting screw 24 and which tends to flatten the drive member or flex it in a direction toward the wall 62 of recess 60 and resiliently urge the radially outer peripheral edges 51 and 52 into driving engagement with the walls 61 and 62, respectively, of the recess 60. Since the spiral portion 47 flexes the drive member 27 tending to flatten it, the outer diameter of the drive member 27 increases so that the outer peripheral surface 50 is urged radially outwardly into frictional engagement with the annular wall 61 of recess 60. Thus, the drive member 27 is urged axially and radially against the walls 61 and 62 of the recess 60 to provide good frictional engagement between the drive member 27 and screw 24 so that the turning or rotary forces acting on the drive member 27 in response to movement of the spiral portion 47 in opening 55 is effective in rotating the screw 24.

When the push rod 26 moves in the opposite direction or rightwardly after having rotated the adjusting screw 24, the spiral portion 47 urges the drive member 27 in the opposite direction or rightwardly against the force of spring 57 and the drive member springs back or returns to its original bowed shape due to the inherent resiliency thereof to thereby reduce the friction between the drive member and adjusting screw. Thus, when the spiral portion 47 moves rightwardly in opening 55 it returns the drive member to its original bowed shape and rotates it back to its original position, as shown in FIG. 2, but without rotating the adjusting screw 24. Any driving force applied to the screw 24 by the drive member 27 when the drive member is rotated by rightward movement of the spiral portion 47 is insufficient to overcome the inherent friction between the threads of screw 24 and the bracket housing 16; thus, the screw 24 is not rotated in the reverse direction.

In describing the operation of the automatic adjusting mechanism 18, it will first be assumed that there is a desired predetermined amount of clearance between the drum 7 and lining 5 of brake shoe 4 and the drum is rotating in the forward direction so that end 10 is the displaceable end of shoe 4. When the wheel cylinders 8, 8a are energized, such as by transmitting fluid pressure thereto from a source of fluid pressure, for example, a master cylinder or the like (not shown), actuating forces are established which effect displacement movement of brake shoes 4, 4a into frictional engagement with the drum 7 to thereby energize the brake 1. During the above-mentioned displacement movement of shoe 4, the force of spring 42 causes push rod 26 to follow the shoe; however, the displacement movement of the push rod will be insufficient to effect rotation of the adjusting screw 24 due to lost motion between the push rod 26 and drive member 27. This lost motion is a result of spacing the spiral portion 47 from the drive member 27 when push rod 26 is in the retracted position and/or because of any "play" or clearance between the inner peripheral surface 54 of the drive member 27 and stem 39. If now the brake 1 is de-energized, such as by exhausting the fluid pressure in the wheel cylinders 8, 8a, the shoe return spring 20 effects retractile movement of the shoes 4, 4a to the retracted position thereof and returns the push rod 26 to the position shown in FIG. 2 and without having rotated drive member 27.

As the friction lining 5 wears due to the frictional engagement thereof with the rotatable drum 7, the displacement movement of shoe 4 and push rod 26 toward drum 7 increases because of the increase in shoe or lining clearance as a result of lining wear. As the displacement movement of the push rod 26 increases with lining wear, the spiral portion 47 eventually enters the opening 55 during a displacement movement of the push rod 26 and shoe 4 to urge the drive member 27 into frictional engagement with the screw 24, in the manner previously discussed herein, and effects rotation of drive member 27 and screw 24 in one direction. This rotation of screw 24 is in a direction causing a slight axial or longitudinal advance movement thereof toward the drum 7, thus effecting an adjustment of the retracted position of shoe 4 which reduces the clearance between lining 5 and drum 7. Because the effective threaded ratio between the threads on adjusting screw 24 and the spiral portion 47 is such that the displacement of the push rod 26 by spring 42 is greater than the axial advance of the screw 24, the above-mentioned rotation and advance of screw 24 does not fully compensate for the amount of increase in shoe clearance during the above displacement stroke of the push rod. On the return or retractile stroke of the shoe 4 and push rod 26, the spiral portion 47 will effect return rotation of drive member 27 to its original position shown in FIG. 2 without rotating screw 24. On the next brake application, the displacement stroke of the push rod will cause spiral portion 47 to again rotate drive member 27 and further rotate and advance the screw 24 to thereby further reduce or return the clearance between lining 5 and drum 7 to the desired predetermined amount. When the shoe clearance is returned to the desired predetermined amount by the automatic adjustment of adjusting screw 24 to compensate for the lining wear, the spiral portion 47, during operation of brake 1, will no longer move sufficiently to enter and drive the drive member 27. Upon the occurrence of further lining wear, the spiral portion 47 will, of course, again effect rotation of drive member 27 and adjusting screw 24 in the manner hereinabove described to compensate for such further lining wear.

Since the spiral portion 47 of rod 26 will effect rotation of drive member 27 to adjust screw 24 substantially each time rod 26 and shoe 4 are displaced in excess of the desired predetermined amount, the automatic adjustment mechanism 18 is able to compensate for very small amounts of lining wear so as to maintain the clearance between the lining 5 and drum 7 substantially constant. The retracted position of the shoe 4 is automatically adjusted even while the lining 5 is wearing during braking operations so that the adjustor unit 21 operates in substantially a stepless manner, as opposed to known prior art adjustment devices which only effect adjustments in a stepwise manner or after a considerable amount of lining wear has occurred.

The brake shoe clearance can be easily manually adjusted when the brake shoe 4 is in the retracted position, such as when installing new brake shoes, by manually rotating the starwheel 23 which, in turn, rotates adjusting screw 24. Since there is relatively little friction between the screw 24 and drive member 27 when the shoe 4 and push rod 26 are in the retracted position, the drive member 27 does not interfere with the manual adjustment of the mechanism 18. Also, when a new brake shoe is installed, the manual adjustment of mechanism 18 is not critical since, in the case of excess clearance, the mechanism 18 will automatically adjust the shoe to provide the desired predetermined clearance upon one or more applications of the brake.

The automatic adjustor unit 21 is a pre-assembled unit which can be readily installed in the housing 16 before shoe 4 is attached without any alteration of brake parts. Unit 21 may be installed by placing the starwheel member 23 in slot 29 and inserting the unit 21 into the bore 22 so that the keyways 32 receive the keys 31 of the starwheel member. The brake shoe 4 may then be assembled in the friction device and the adjustor unit 21 manually adjusted in the manner previously discussed herein to provide a suitable shoe clearance. Also, in many cases, the adjustor unit 21 may be used to replace conventional non-automatic or manual adjusting screws in existing friction devices simply by removing the conventional adjusting screw and replacing it with the unit 21.

As is apparent from the foregoing description and drawings, neither the brake applying forces nor the shoe anchoring forces are applied to or transmitted through the drive member 27 of the adjustor unit 21; thus, the drive member, as well as other parts of the adjustor unit, can be economically made relatively small.

In FIGS. 6 and 6a there is shown a modified form of drive member 27a which may be used in the adjustor unit 21 in place of drive member 27 and which, of course, performs the same function in the adjustor unit 21 as the member 27. Drive member 27a is shown as a bowed or dished washer-like member of resilient metal, such as spring steel, having an irregular or toothed radially outer peripheral surface 50a, and a radially inner peripheral surface 54a defining a noncircular opening 55a shown as a rectangular opening complementary to the shape of stem 39. When the drive member 27a is used in adjustor unit 21, the toothed outer periphery 50a provides a plurality of edges 65 which are resiliently urged into driving engagement with the recess wall 61 when the spiral portion 47 of rod 26 moves in opening 55a and flexes or tends to flatten the drive member 27a to thereby provide a high amount of friction between the adjusting screw 24 and drive member 27a for rotating the screw 24.

It is now apparent that novel automatic adjustment means meeting the objects set out hereinabove are provided and that changes and modifications in the disclosure may be made by those skilled in the art without departing from the spirit and scope of the invention as defined by the claims which follow.

The embodiments of the invention in which an exclusive property or privilege is claimed are defined as follows:

1. In a friction device having a friction member movable between a retracted position and a displaced position in frictional engagement with a coacting member, means defining the retracted position of said friction member including support means, and extendable means rotatably supported by said support means and extendable relative thereto when rotated to adjustably define the retracted position of said friction member, a follower member movable relative to said extendable means and engaged with said friction member for concerted movement therewith, a drive member for frictional driving engagement with said extendable means to effect the adjusting rotation thereof including a surface defining an opening therein, and spiral wall means on said follower member movable in said opening into driving engagement with said surface to initially urge said drive member into frictional engagement with said extendable means and thereafter rotate said drive member and said extendable means to adjust the retracted position for said friction member in response to the follower member movement in excess of a predetermined amount.

2. In a friction device having a friction member movable between a retracted position and a displaced position in frictional engagement with a coacting member, means defining the retracted position of said friction member including support means, and an extendable member rotatably supported by said support means and extendable relative thereto when rotated to adjustably define the retracted position of said friction member, said extendable member having an axial bore therein and a recess defined by a generally cylindrical wall and a radially extending wall intersecting said cylindrical wall, an elongated follower member mounted for axial movement in said bore and engaged with said friction member for concerted movement therewith, and a drive member of resilient metal having a radially outer peripheral surface and a radially inner peripheral surface defining an opening therein, said drive member being disposed on said follower member and normally engaging said radially extending wall, said follower member having spiral wall means thereon movable in said opening into driving engagement with said inner peripheral surface to flex said drive member to resiliently urge said outer peripheral surface into driving engagement with said cylindrical wall and rotate said drive member to effect rotation of said extendable member and adjust the retracted position of said friction member in response to movement thereof in excess of a predetermined amount.

3. In a friction device having a friction member movable between a retracted position and a displaced position in frictional engagement with a coacting member, means defining the retracted position of said friction member including support means, and an extendable member rotatably supported by said support means and extendable relative thereto when rotated to adjustably define the retracted position of said friction member, said extendable member having an axial bore therein and a recess defined by a generally cylindrical wall and a radially extending wall intersecting said cylindrical wall, an elongated follower member mounted for axial movement in said bore and engaged with said friction member for concerted movement therewith, and a normally curved drive member of resilient metal having a radially outer peripheral surface and a radially inner peripheral surface defining an opening therein, said drive member being disposed on said follower member normally in engagement with said radially extending wall and with said outer peripheral surface in said recess, said follower member having spiral wall means thereon movable in said opening into driving engagement with said inner peripheral surface to flex said drive member in a direction toward said radially extending wall and urge said outer peripheral surface into driving engagement with said cylindrical wall and to rotate said drive member to effect rotation of said extendable member and adjust the retracted position of said friction member in response to movement of said friction member in excess of a predetermined amount.

4. The friction device according to claim 3 wherein said outer peripheral surface of said drive member has a plurality of teeth frictionally engageable with said cylindrical wall.

5. In a friction device having a movably mounted friction member, a rotatable coacting member, actuating means engaged with said friction member for displacing said friction member from a retracted position to a displaced position in frictional engagement with said coacting member, and return spring means connected to said friction member for moving said friction member from engagement with said coacting member to the retracted position, automatic adjustment means for maintaining the displacement movement of said friction member relative to said coacting member substantially at a predetermined amount irrespective of friction member wear occasioned by said frictional engagement comprising support means, an adjustable anchor member for said friction member supported by said support means and extendable relative thereto when rotated to adjustably define the retracted position of said friction member, said anchor member having an axial bore therein and a recess defined by a cylindrical wall and a radially extending wall intersecting said cylindrical wall, an elongated follower member mounted for axial movement in said bore and engaged with said friction member, resilient means disposed in said bore normally urging said follower member toward engagement with said friction member to effect concerted movement thereof, a normally bowed drive member of resilient metal having a radially outer peripheral surface and a radially inner peripheral surface defining an opening therethrough, said drive member being disposed on said follower member with said outer peripheral surface in said recess, and spring means on said follower member normally urging said drive member into engagement with said radially extending wall, said follower member having spiral wall means thereon movable in said opening into driving engagement with said inner peripheral surface of said drive member to flex said drive member in a direction toward said radially extending wall and urge said outer peripheral surface into frictional engagement with said cylindrical wall and to rotate said drive member to effect rotation of said anchor member and adjust the retracted position of said friction member in response to movement of said friction member in excess of a predetermined amount.

6. In a friction device having a movably mounted friction member, a rotatable coacting member, actuating means engaged with said friction member for displacing said friction member from a retracted position to a displaced position in frictional engagement with said coacting member, and return spring means connected to said friction member for moving said friction member from engagement with said coacting member to the retracted position, automatic adjustment means for maintaining the displacement movement of said friction member relative to said coacting member substantially at a predetermined amount irrespective of friction member wear occasioned by said frictional engagement comprising support means, an adjustable anchor member for said friction member supported by said support means and extendable relative thereto when rotated to adjust the retracted position of said friction member, said anchor member having an axial bore therethrough and a recess in the exterior side of one end wall thereof defined by a cylindrical wall and a radially extending wall intersecting said cylindrical wall, an elongated follower member mounted for axial movement in said bore having one end portion thereof engaged with said friction member and engageable with the opposite end wall of said anchor member to define the retracted position of said friction member, resilient means disposed in said bore normally urging said follower member toward engagement with said friction member to effect concerted movement thereof, a normally bowed drive member of resilient metal having a radially outer peripheral surface and a radially inner peripheral surface defining an opening therethrough, said drive member being disposed on said follower member with said outer peripheral surface in said recess and with its concave side facing said radially extending wall, and spring means on said follower member between the convex side of said drive member and the opposite end portion of said follower member normally urging said drive member into engagement with said radially extending wall, said follower member having spiral wall means thereon movable in said opening into driving engagement with said inner peripheral surface of said drive member to flex said drive member in a direction toward said radially extending wall and urge said outer peripheral surface into frictional engagement with said cylindrical wall and to rotate said drive member to effect rotation of said anchor member and adjust the retracted position of said friction member in response to movement of said friction member in excess of a predetermined amount.

7. An automatic adjustor assembly for automatically controlling the retracted position of a movable friction member of a friction device having a fixed support member with a threaded opening therein adjacent said friction member, said adjustor assembly comprising an externally threaded adjusting screw for threaded connection in said opening, said screw having an axial bore therein and a recess defined by a cylindrical wall and a radially extending wall intersecting said cylindrical wall, an elongated follower member mounted for axial movement in said bore and having an end portion for engagement with said friction member and said adjusting screw to define the retracted position of said friction member, first resilient means disposed in said bore for urging said follower member into following engagement with said friction member, a rotatable drive member of resilient metal on said follower member having a radially outer peripheral surface and a radially inner peripheral surface defining an opening therethrough, and second resilient means on said follower member normally resiliently urging said drive member into engagement with said radially extending wall, said follower member having a spiral wall means thereon movable in said opening in said drive member into sliding engagement with said inner peripheral surface to flex said drive member in a direction toward said radially extending wall and urge said outer peripheral surface into driving engagement with said cylindrical wall and effect rotation of said drive member and said screw to move said screw axially in said threaded opening for adjusting the retracted position of said friction member in response to movement of said follower member in excess of a predetermined amount.

8. In a friction device having a friction member displaceable from a retracted position toward frictional engagement with a coacting member, means adjustably movable on said friction device and defining a retracted position for said friction member, a friction connection for frictional driving engagement with said first named means to effect the adjusting movement thereof, follower means movable relative to said first named means for following engagement with said friction member, said follower means and friction connection respectively including means responsive to the movement of said follower means to urge said friction connection into frictional driving engagement with said first named means and to thereafter translate the movement of said follower means into adjusting movement of said first named means to redefine the retracted position for said friction member.

9. In a friction device having a friction member movable between a retracted position and a displaced position in frictional engagement with a coacting member, means adjustably movable on said friction device and defining a retracted position for said friction member, other means defining a friction connection for frictional driving engagement with said first named means to effect the adjusting movement thereof, aperture means in said other means, and follower means engaged for concerted movement with said friction member including driving means movable through said aperture means for driving engagement with said other means, said driving means being movable through said aperture means upon movement of said follower means to drivingly urge said other means into frictional driving engagement with said first named means and thereafter translate the movement of said follower means into adjusting movement of said first named means to redefine the retracted position for said friction member.

References Cited by the Examiner
UNITED STATES PATENTS
3,115,955   12/1963   Knocke _____ 188—196

References Cited by the Applicant
UNITED STATES PATENTS

| | | |
|---|---|---|
| 1,613,778 | 1/1927 | Worden. |
| 2,130,875 | 9/1938 | Colman. |
| 2,695,078 | 11/1954 | Brooks. |
| 2,730,205 | 1/1956 | Bauman. |
| 2,748,901 | 6/1956 | Brooks. |
| 2,774,445 | 12/1956 | Pontius. |
| 2,788,095 | 4/1957 | Brooks. |
| 2,818,143 | 12/1957 | Phillips. |
| 2,938,610 | 5/1960 | Dombeck. |

DUANE A. REGER, *Primary Examiner.*